United States Patent [19]
Taig

[11] 3,875,966
[45] Apr. 8, 1975

[54] POWER ASSISTANCE CONTROL DEVICE

[75] Inventor: Alistair Gordon Taig, Bristol, England

[73] Assignee: Bendix Westinghouse Limited, Bristol, England

[22] Filed: July 16, 1973

[21] Appl. No.: 379,231

[30] Foreign Application Priority Data
July 19, 1972 United Kingdom............... 33871/72
Aug. 9, 1972 United Kingdom............... 37144/72
Dec. 2, 1972 United Kingdom............... 55785/72

[52] U.S. Cl. .......................................... 137/625.21
[51] Int. Cl. ............................................ F16k 11/02
[58] Field of Search ...... 137/625.21–629.24; 91/375

[56] References Cited
UNITED STATES PATENTS
3,587,645  6/1971  Mengual....................... 137/625.21

*Primary Examiner*—Henry T. Klinksiek
*Attorney, Agent, or Firm*—Larson, Taylor & Hinds

[57] ABSTRACT

An hydraulic power assistance control valve arrangement consists of an hydraulic fluid flow divider which is self setting to adjust the flow in two parallel fluid flow paths in accordance with the restrictions imposed in these paths downstream of the flow divider and a valve arrangement coupled to the steering shaft of a steering mechanism to impose such restrictions when the shaft is rotated and thereby give rise to a hydraulic fluid pressure differential between the pressures upstream of the restrictions, for use in effecting operation of the power assistance means, the areas of the valve means being such as to provide cavities of sufficiently large area that the effective fluid pressures therein generate a net reaction which is applied through the steering shaft to hydraulically endow the apparatus with feel in operation.

21 Claims, 21 Drawing Figures

POWER ASSISTANCE CONTROL DEVICE

This invention relates to a power assistance control device and relates especially to power assistance control valve apparatus for a vehicle steering mechanism.

It has previously been proposed to provide a control device for a hydraulic power assisted steering mechanism which includes a torsion bar which is arranged to transmit a motion between two parts and the torsion bar is provided with valve members which move with one part and co-operate with fluid flow orifices in opposed fluid paths provided in a valve member which is rotatable with the one part via the torsion bar. The complementary opening and closing of the said orifices according to the torque applied to the torsion bar generates different fluid pressures up stream of the two orifices and these fluid pressures are effective to provide operation of the power assiatance for the mechanism.

In such a control device the construction is such that if the power assistance is to be efficient the torsion bar must necessarily be such as to give little reaction to a steering wheel movement so that the system lacks feel whereas increase of feel by increasing the torsion of the torsion bar results in reduced power assistance.

According to the present invention there is provided a hydraulic power assistance control device for providing power assiatance for an effort exerted by a control part, the device having fluid input port and a fluid output port, a fluid flow divider for dividing fluid flow from the input port between two parallel fluid flow paths, the flow divider being such as to provide flow restriction in said paths and including means whereby an increase of fluid pressure downstream thereof in one path relative to that in the other path gives rise to an increased restriction in the latter path, the device also including valve means having a first valve member dislaceable by the control part relative to a further valve member in either of two directions from an intermediate position, and a respective pressure output port connected to each said path between the flow divider and the valve means, the valve members being so shaped as to on the one hand provide between them variable restrictions in each said path such that a said movement is effective to increase one restriction and on the other hand to provide between them respective reactive cavities in the flow paths, the fluid pressure acting within the cavities to produce reactions between the members which are transmissible to and counteracted by the control part.

Further cavities may be provided upstream or downstream of the said variable restrictions provided by the valve means between said restrictions and further restrictions to present appreciable flow dependent or pressure dependent reactions.

The members may also mutually resiliently loaded to urge the control part towards a predetermined position corresponding to the said intermediate position. Whilst such loading is by no means essential it is provided, as a matter of convenience, in a power assisted steering mechanism to provide centering when no fluid pressure supply is present. Since however such resilient loading is weak as it is not required to provide any appreciable feel, it may be arranged that it does not detract from the sensitivity of the system.

The said fluid flow divider may be so arranged as to concentrate the fluid flow between the input and outlet ports predominantly or even totally via the flow path which includes the greatest restriction between the valve members.

In order that the invention may be more clearly understood and readily carried into effect the same will be further described by way of examples with reference to the accompanying drawings in which:

FIGS. 2, 3, 4, 5 and 6 are sectional or diagrammatical views of the or parts of the apparatus of FIG. 1, FIGS. 7 and 8 are sectional views of another example of an hydraulic power assistance control device in accordance with the invention.

Figure 9A:
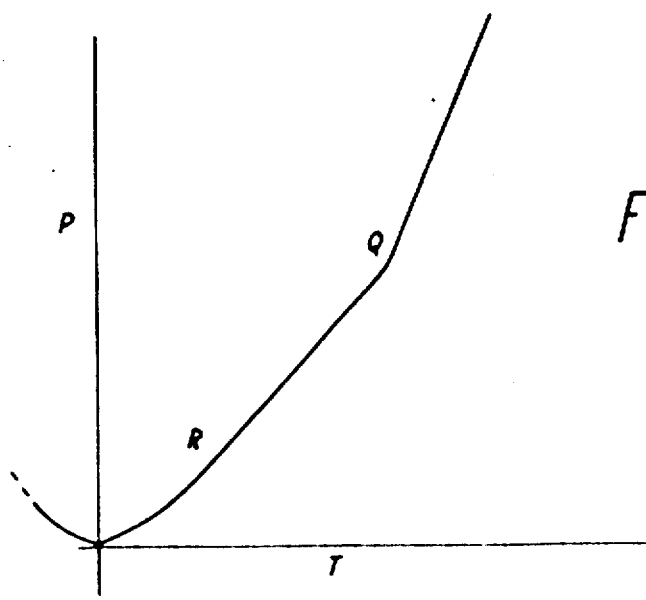
Figure 9B:
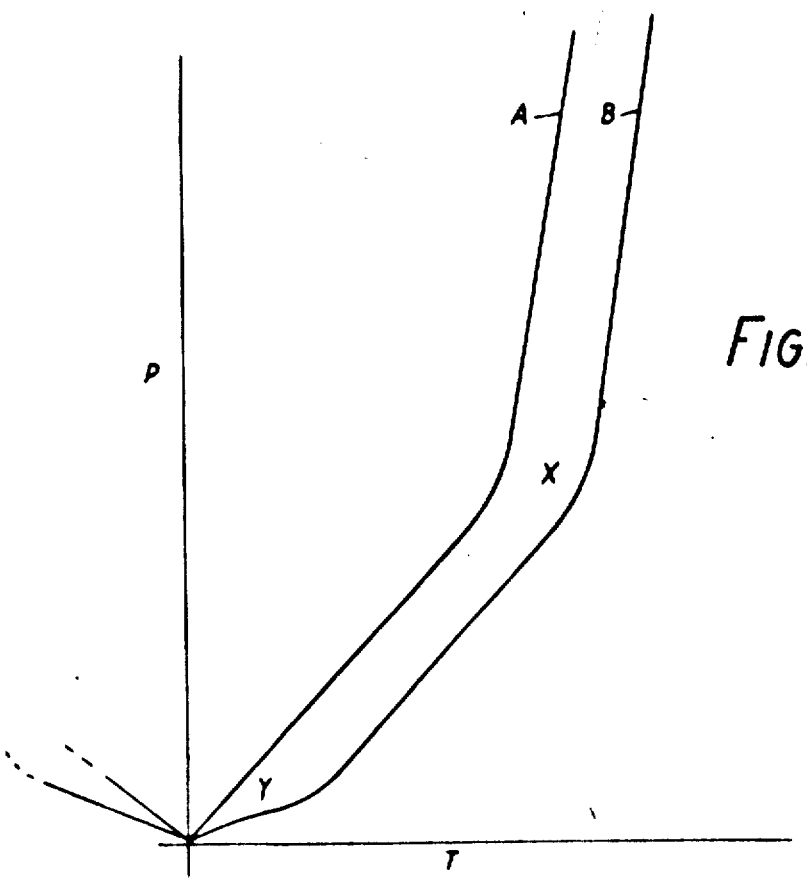
Figure 10A:
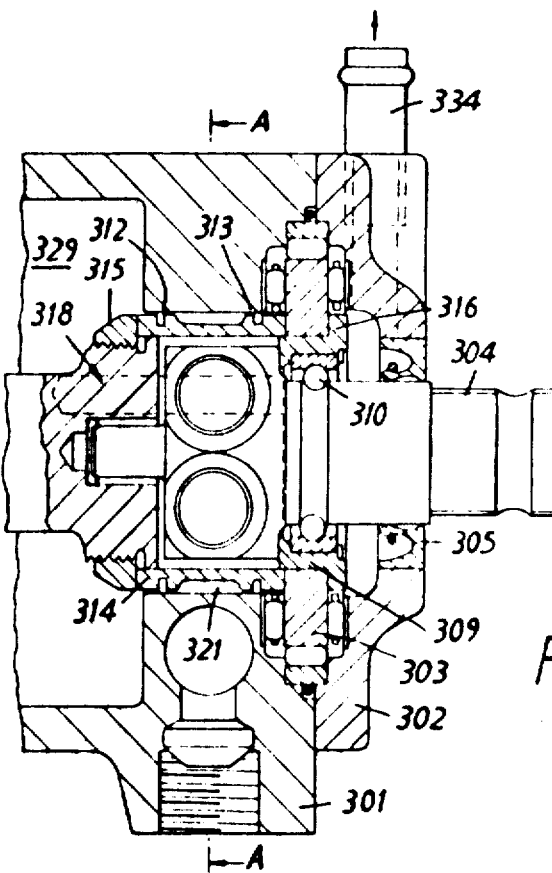
Figure 10B:
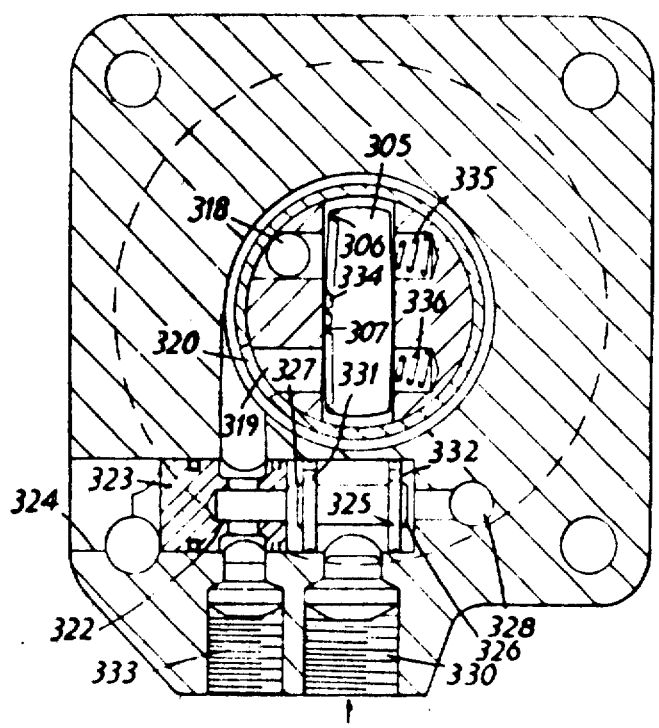
Figure 11A:
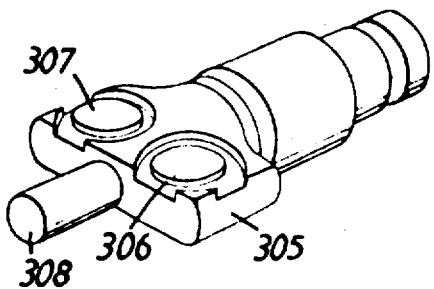

FIGS. 9(a) and 9(b) are graphical illustrations of a performance characteristic, FIGS. 10(a) and 10(b) are sectional views of yet another example, FIGS. 11(a) and (b) are perspective views of two members utilised in the device of FIGS. 10(a) and 10(b).

Figure 12:
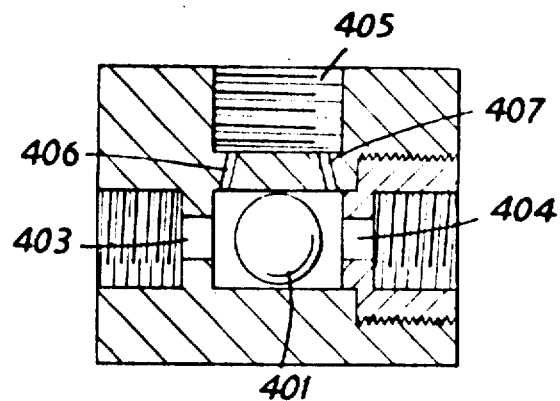

FIG. 12 is a section view of an alternative form of flow divider.

Figure 13A:
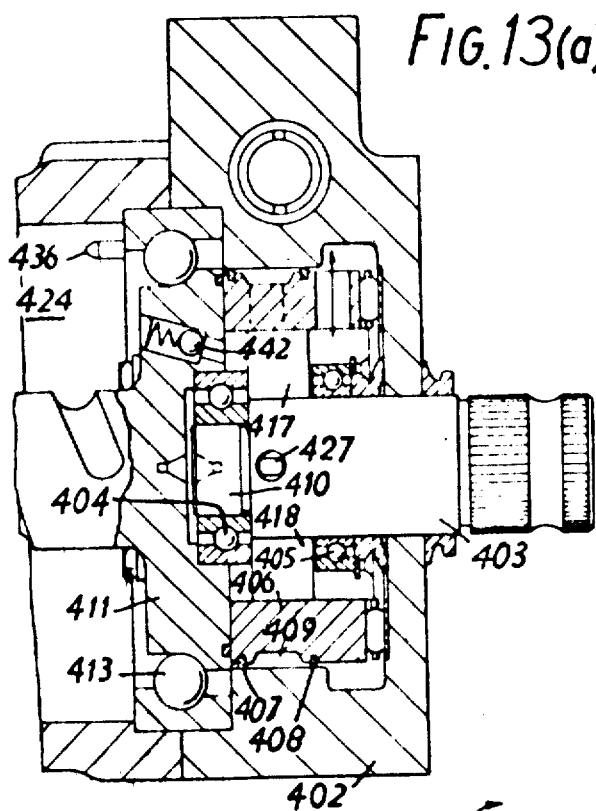
Figure 13B:
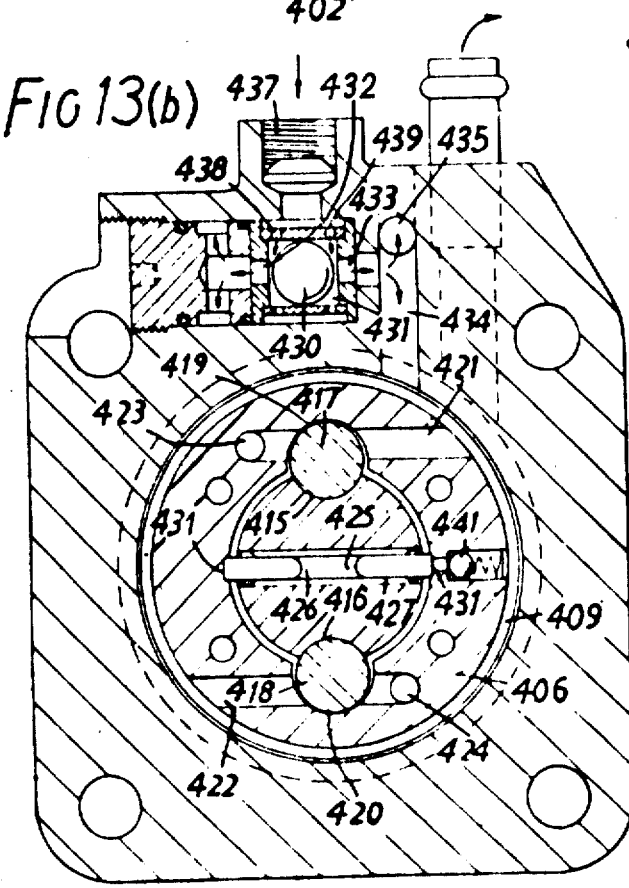

FIGS. 13(a) and 13(b) are sectional views of a further embodiment.

Figure 14:
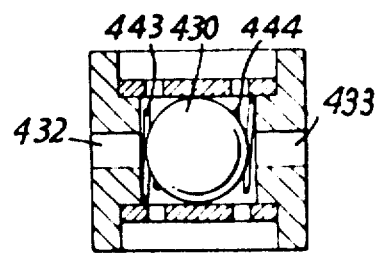

FIG. 14 is a sectional view of a modified form of flow divider.

Figure 15:
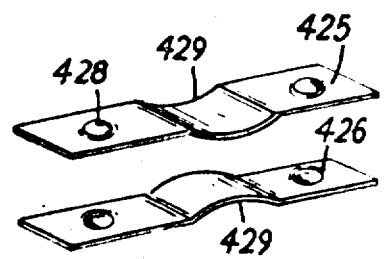

FIG. 15 is a detailed view of spring memmbers as used in FIGS. 13(a) and 13(b).

Figure 16:
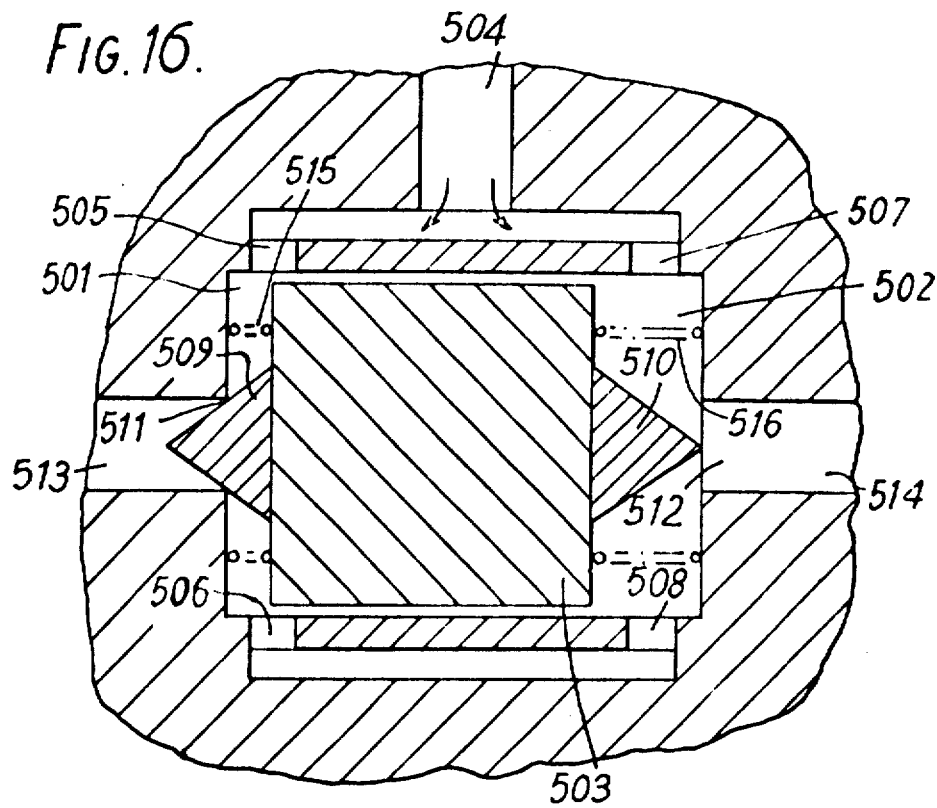

FIG. 16 is a sectioned illustration of a further form of flow divider usable in the earlier embodiments.

Figure 17:
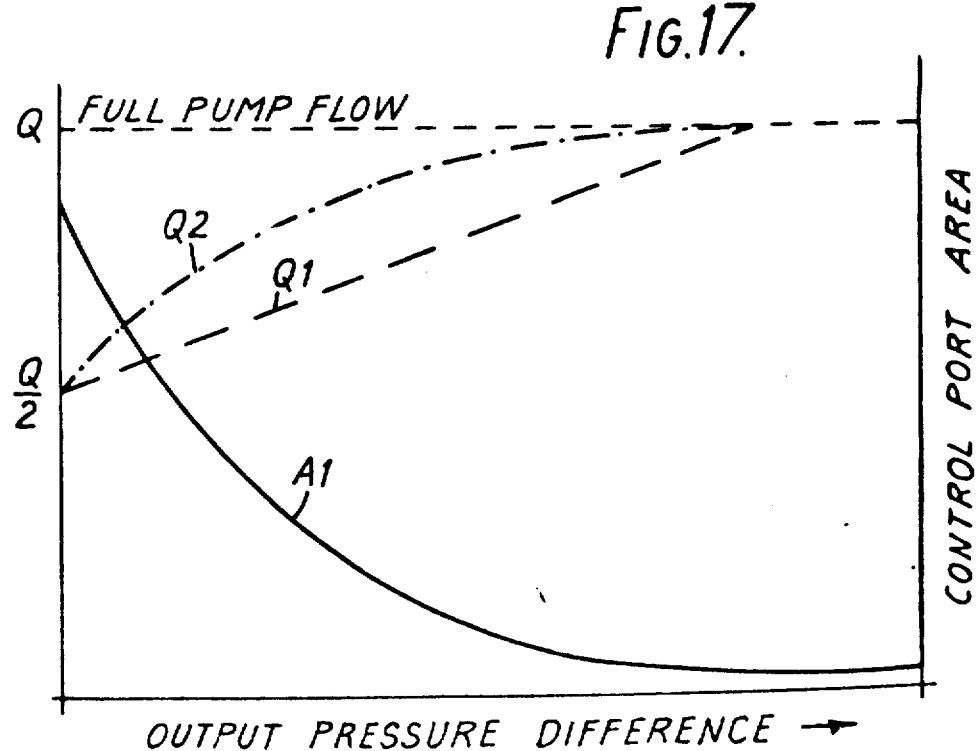

FIG. 17 is a graphical illustration of certain operating characteristics.

Figure 1:
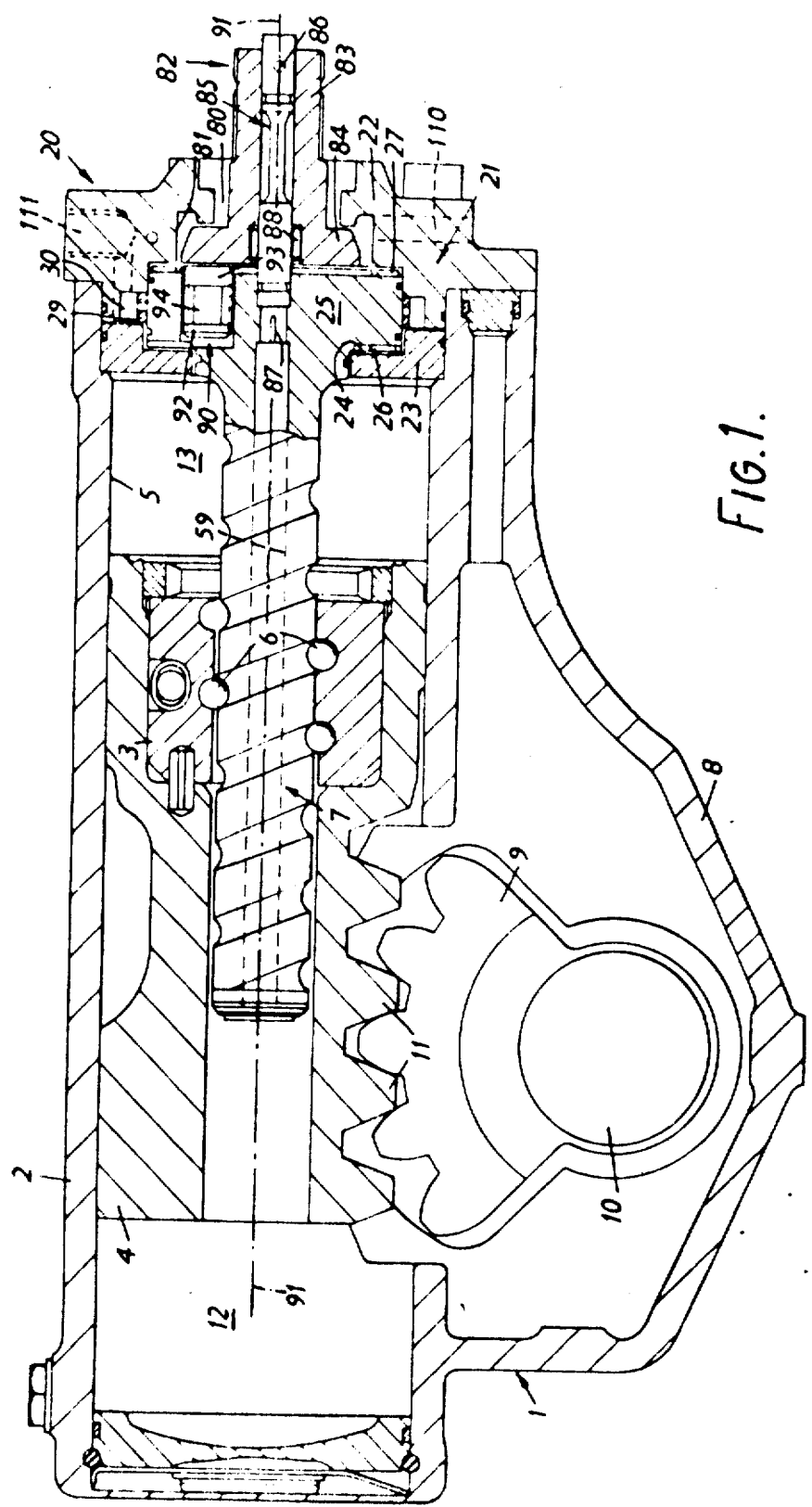
FIG. 1, is a sectional view of a power assisted type of vehicle steering box apparatus including an hydraulic power assistance control device in accordance with one example of the invention.
Figure 2:
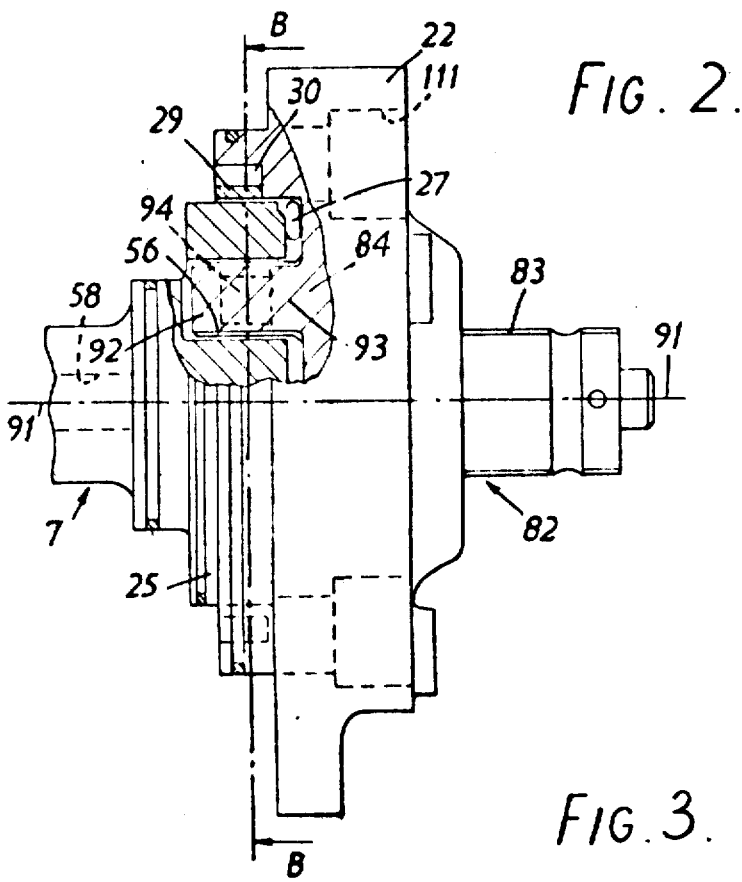
Figure 3:
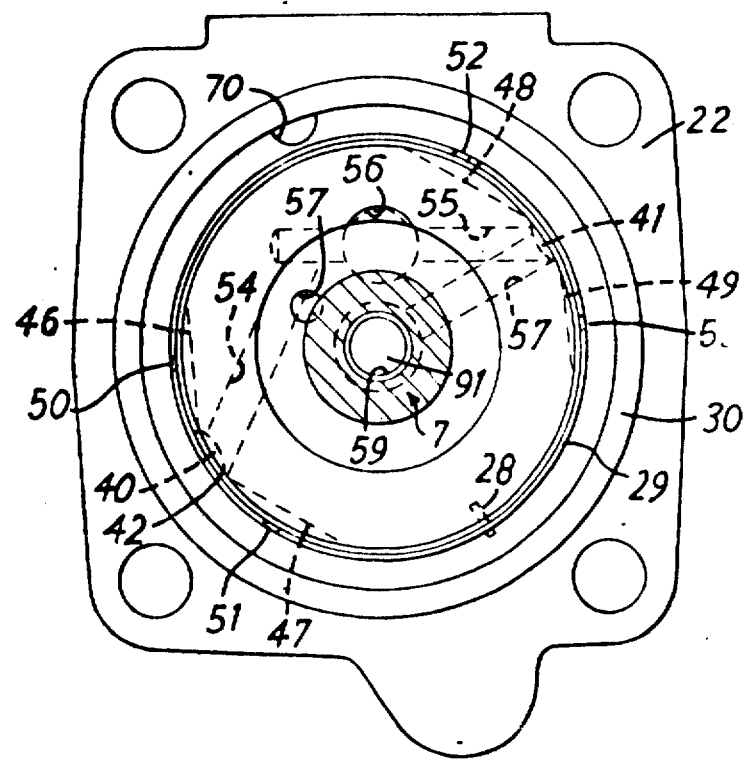

Referring to FIGS. 1 to 6 of the accompanying drawings, the manually-controlled hydraulic power-assisted steering mechanism here shown is of the recirculatory-ball type and, as can be seen primarily from FIG. 1, comprises a steering box 1 in an upper portion 2 of which is the conventional ball-nut 3 located in an hydraulic piston 4 operable in a cylinder 5 formed in this upper portion 2, the recirculating balls 6 being located between the nut 3 and the helically-grooved shaft 7. In a lower portion 8 of the steering box 1 is a segmental gear 9 secured to a shaft 10 angular displacement of which effects steering of the vehicle, which gear 9 meshes with teeth 11 on the piston 4. A cylinder 5 provides, one at each end of the piston 4, chambers 12 and 13 into which can be introduced hydraulic fluid under pressure to assist leftward/rightward movement of the piston 4 (and, therefore, clockwise/anti-clockwise movement of gear 9 and shaft 10 to effect steering of the vehicle) as such movement is sought to be effected by rotation of the shaft 7.

At the right-hand end (as viewed in FIG. 1) of the steering box 1, is a control-valve portion 20. This portion includes a housing 21 constituted by an end plate 22 of the steering box 1, and a transverse wall 23 extending across the steering box 1. The plate 22 and the wall 23 provide between them a chamber 24 into which projects through the wall 23 an enlarged head-portion 25 of the shaft 7. The shaft 7 is axially located with the steering box 1 between thrust rings 26 and 27 one on each side of the portion 25 of the shaft 7. Loosely surrounding the portion 25 for radial movement relative thereto but located by pin 28 against circumferential movement with respect thereto, is an annulus 29. This annulus 29 lies in a chamber 30 also formed by the plate 22 and the wall 23.

Turning now particularly to FIG. 4 in which the transverse cross-sectional shape of the head-portion 25 of the shaft 7 is shown, it can be seen that the periphery of the head-portion 25 is of such a configuration that it provides between that periphery and the annulus 29 two chambers 40 and 41 the boundaries of which are provided by valve seats 42 and 43 respectively. The valve seats 42 and 43 are engageable against adjacent portions 44 and 45 respectively of the annulus 29. On each side of the chamber 40 are further chambers 46 and 47 respectively and, similarly, on each side of the chambers 44 are further chambers 48 and 49 respectively. Providing communication between the chamber 30 exterior of the annulus 29 and the chambers 46, 47, 48 and 49, are ports 50, 51, 52 and 53 respectively which pierce the annulus 29. Opening into the chambers 40 and 41 respectively are conduits 54 and 55 in the headportion 25; the other end of each conduit 54 and 55 opening into an off-centre bore 56 in the head-portion 25. The conduit 54 connects with one end of a further conduit 57 the other end of which opens into the chamber 13 in the cylinder 5 on the right-hand end of the piston 4, and the conduit 55 connects (via the chamber 41) with one end of a further conduit 58 the other end of which opens into an axial bore 59 (FIGS. 1 to 3) in the shaft 7 which communicates with the chamber 12 in the cylinder 5 on the left-hand end of the piston 4.

Projecting through the end of plate 22 (and journalled therein by bearing 80) into a chamber 81 formed in the end plate 22, is an input member 82 having a hollow tubular stem portion 83 (which projects out of the steering box 1 — see FIG. 1) and a head-portion 84. The tubular stem portion 83 is splined on its exterior surface for connection to the column of a steering sheel (not shown) and the member 82 is mechanically connected to the shaft 7 by a torque rod 85. The right-hand end (as viewed in FIG. 1) of the torque rod 85 is fixed to the input member 82 by pin 86 and the left-hand end of the shaft 7 by being splined thereto at 87. The input member 82 is rotationally mounted on the left-hand end of the torque rod 85 by a bearing 88.

Projecting from the head-portion 84 of the input member 82 is a spigot 90 which projects into the bore 56 in the head-portion 25 of the shaft 7. The spigot 90 constitutes a loose fit in the bore 56 so that it may be bodily displaced therein about the axis 91 of the shaft 7. The end portions 92 and 93 of the spigot 90 are of full diameter but the mid-portion 94 has a cross-sectional configuration the form of which can most readily be seen from the enlarged view in FIG. 6. The cross-sectional configuration of a mid-portion 94 of the spigot 90 provides between that portion and the bore 56 in the head-portion 25 of the shaft 7, two opposed cavities 95 and 96 which communicate with conduits 54 and 55 respectively. The spigot 90 has been ground (in its manufacture) about two axes equidistantly spaced about the central axis of the spigot 90 so that the seat 97 constituted by the edges of the cavity 96 (or the valve seat 98 constituted by the edges of the cavity 95) is complementary in shape to the respective portion of the bore 56 encircling the end of the conduits 54 and 55.

At right-angles to the cavities 95 and 96, the mid-portion 94 of the spigot 90 forms with the bore 56 a further pair of passages 99 and 100 which communicate with the cavities 95 and 96 (in the position of the spigot 90 as shown in FIG. 6) via conduits 101, 102, 103, and 104 in the spigot 90.

The passages 99 and 100 open into the chamber 81 in the end plate 22 (FIG. 1) and, through this chamber, are connected to an outlet port 110.

In operation of the vehicle steering mechanism of FIGS. 1 to 6 it will be assumed that the hydraulic cavities, chambers, valves and passages thereof are filled with hydraulic fluid from an hydraulic fluid pump which is not shown. Fluid from the hydraulic pump flows via the inlet port 111 to the annular chamber 30 whicn includes the annulus 29 and via the bores 50, 51, 52 and 53 in the annulus towards chambers 46, 47, 48, 49. At this time it is assumed that no effort is being exerted on or by the steering mechanism so that the fluid flow tends to divide substantially equally between the two parallel flow paths with little pressure being generated. The first flow path is via ports 50, 51, valve seat 42, chamber 40, passage 54, cavity 95, valve seat 98, cavities 101 and 104 and passages 99 and 100 and subsequently to the outlet port 110 and the fluid sump. The second flow path is identical and is via ports 52 and 53, valve seat 43, chamber 41, passage 55, cavity 96, valve seat 97, cavities 102 and 103 to passages 99 and 100 and subsequently to the outlet port 110 and the fluid sump. Since the inlet port 111 and the outlet port 110 are at the ends of each of these paths, the pressure drop across each path must be identical and the only changes which can take place for a given inlet port pressure are changes of pressure distribution over the various ports of the two paths. In the present position, the annulus 29 is thus substantially balanced, in a "floating" condition, equally spaced from valve seats 42 and 43.

Assuming that a force is exerted by the steering mechanism to react the road-wheels of the vehicle and at the same time, the input member is held at its set position by the vehicle driver steadying the steering wheel, the reaction process therefore includes a relative movement between the spigot 94 and the bore 56. This movement gives rise to a redistribution of pressure drops in the two fluid paths owing in the first instance to the movement, say, of seat (FIG. 6) towards the bore surface 56 and of the seat 97 away from the latter bore surface. This gives rise to an increase of pressure in passage 54 and a reduction in 55. Since however the total pressures in both paths are always equal, the pressure in chamber 40 and passage 54 is increased together with the pump output pressure, leaving the pressures in chamber 41 and passage 55 close to outlet port pressure. There is therefore a resultant attendant reaction exerted between the spigot 90 and the bore. In order to maintain pressure equality in both paths moreover the effect of the engagement is that the annulus formerly in an equilbrium state equally spaced from seats 42 and 43, is urged away from seat 42 and towards seat 43 in re-establishing an equilibrium state of flow and pressure relationships as will be explained. Accordingly, when pressure is increased in chamber 40 as a result of movement of spigot 90 towards passage 54, the annulus 29 is urged away from seat 42 towards seat 43 thus causing an increased pressure drop between chambers 48, 49 and chamber 41. The force balance on the inside surface of the annulus is now the result of a substantially equal pressure over the area exposed to chambers 40, 46 and 47 acting in opposition to a pressure in cavities 48 and 49 and a reduced pressure in cavity 41. Therefore the pressure in chambers 48 and 49 must therefore be greater than those in chambers 46 and 47 and this can only be achieved when the flow through restrictions 52 and 53 is less than that through restrictons 50 and 51. The difference in flow between the two paths is substantially proportional to the pressure difference between chambers 40 and 41. The effect of this is that a much higher flow occurs in the higher pressure passage 54 than in the lower pressure passage 55. In this instance the effect is thus one in which by the increase of pressure 54 and decrease of pressure 55, the hydraulic fluid pressures incylinders 12 and 13, are respectively increased and reduced to provide the requisite power assistance to urge the piston 4 in a direction to oppose the reaction from the road wheels, namely to urge piston 4 to the right in FIG. 1.

Considering in more detail the effect which occurs at the spigot which is placed down-stream in the two flow paths considered, as already observed, in the absence of any reaction substantially equal flow of fluid occurs in each side thereof. When a clockwise torque (say) is applied to the input shaft of the apparatus, the spigot 90 moves laterally within the bore 56 in order to restrict flow between cavity 95 and cavity 101 and 104 which causes the pressure rise in cavity 95 and passage 54. This rise reacts with the spigot and opposes the applied torque until equilibrium is again attained as a result of the power assistance afforded thereby as described above. The characteristic of the pressure rise with applied input shaft torque may be a linear relationship in the simplest case but by providing further restrictions such as those shown in FIG. 6 between cavity 101 and passage 100 and between cavity 104 passage 99, the characteristic can be readily modified. If such further restrictions are provided as shown in FIG. 6, the torque is reacted against by pressure responsive cavity 95 on the one hand and by flow responsive cavities 101 and 104 on the other. The restrictions provided between cavities 101 and 104 and the outlet passages 100 and 99 are substantially constant whereas those at 98 vary with movement of the spigot. A characteristic in which output pressure rises more rapidly with torque is achieved in general by reducing the area of the cavities upstream of the variable restrictions. The flow responsive downstream cavities then provide a less rapid rise of pressure with torque up to the full flow.

A typical characteristic of steering shaft torque against pressure output is shown in FIG. 9(a). The first part of the curve, up to the point R, is the region of normal operation where the vehicle is running along with little steering force required and that part of the curve provides reaction and steering force predominantly through the torsion bar 85. Thereafter, for larger torques such as may be experienced on cornering, the torque is reacted against by the pressure generated in the primary pressure dependent cavity 95 and also by the flow dependent cavities 101 and 104. At the point Q, full flow is assumed to have been established via the cavities so that no further contribution to the reaction can be provided by the flow responsive cavities 101 and 104. Hence the part of the curve above Q is of greater slope and whilst it provides increasing power assistance, increase of reaction is at a lower rate and parking forces are generated but with less "feel". This effect is therefore of considerable value in that whilst the cavities and therefore reactions generated with normal rolling steering torques can be adjusted to be sufficient to provide the steering shaft with a suitable degree of hydraulic feel, the characteristic as described can enable considerably enhanced parking torque characteristics to also be incorporated.

From the foregoing it will be seen that the bar 85 is included in order that a positive self centering link is provided at all times between the shaft 82 and the steering linkages themselves so that a positive centering action is always present from the point of view of the vehicle steering wheel. Whilst the torsion bar might be omitted, it will be appreciated that steering wheel movement may then occur as apparent backlash in the system when the system is not pressurised, the amount of the backlash or lost motion may be small, but depends upon the design of the spigot 90 in relation to the bore 56. This is preferably such that in the neutral position can sufficient spacings exist between seats 97 and 98 and the bore 56, the spigot being of slightly oval configuration. In the absence of the bar 85, the steering would function correctly in most conditions when the pump is working but on release of the steering wheel the inertia of the wheel would present a rapid return to centre due to the high sensitivity valve in effect opposing such motion.

It will be seen from the above description that the annulus 29 in conjunction with the periphery of the headportion 25 of the shaft 7 constitutes a flow-dividing valve which divides the flow into the paths connected to chambers 40 and 41 equally between those paths for so long as the pressures in the chambers 40 and 41 are substantially equal but establishes assymmetry of flow in favour of the high-pressure path once a pressure difference is established in the chambers 40 and 41. The bore 56 in conjunction with the periphery of the spigot 90 will be seen to constitute a reaction valve to generate on the spigot 90 (and, therefore, on the manualy-operated steering wheel) a hydraulic reactive torque which is in the opposite direction to and is in value related to the manually-applied input torque.

Whilst the above-described embodiment shows the control valve as applied to a recirculatory-ball form of steering, the invention is equally applicable to other types of steering box, for example, rack-and-pinion steering boxes.

Figure 7:
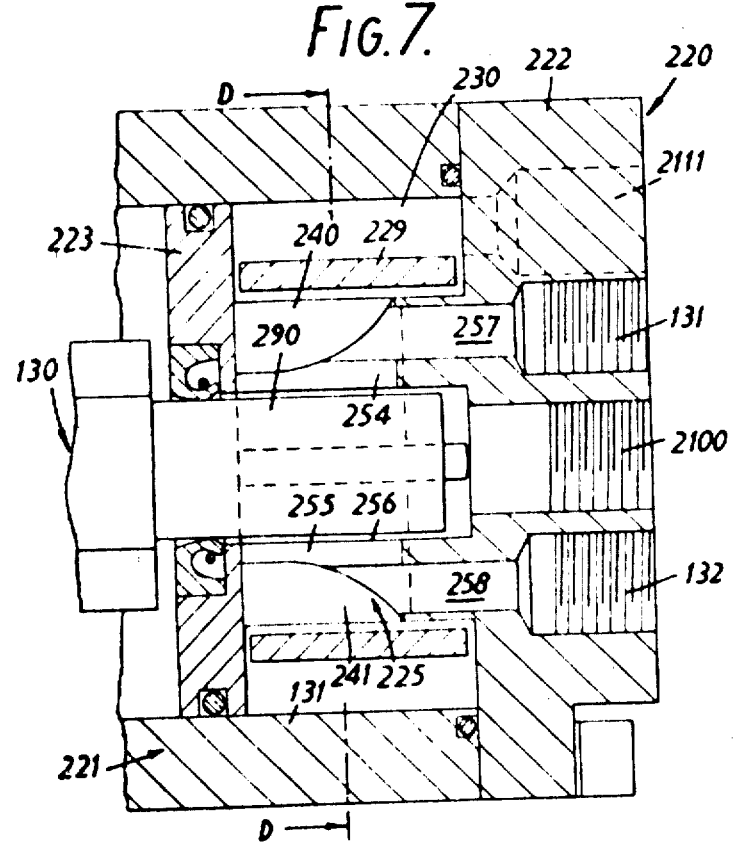
Figure 8:
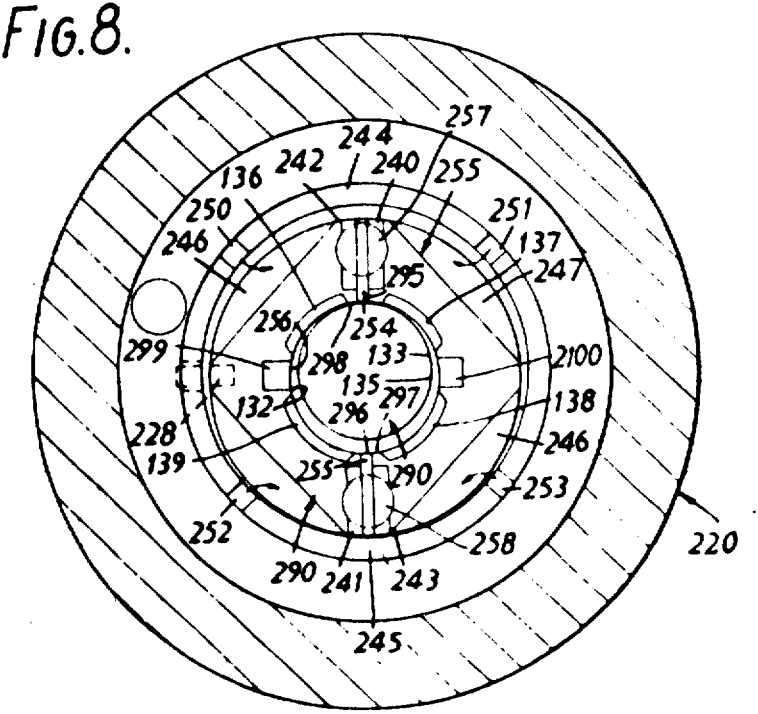

Turning now to FIGS. 7 and 8 there is here described an alternative form of control valve which is especially useful when used in conjunction with a rack and pinion steering mechanism and when so employed includes no springs or torsion bar.

In the embodiment of FIGS. 7 and 8, the reference numerals for parts having the functional equivalency of parts in the embodiment of FIGS. 1 to 6 are similar to the reference numerals for those parts in FIGS. 1 to 6 save in that they are prefaced with the numeral "2".

The FIGS. 7 and 8 show, substantially, only the control-valve portion 220 of the steering mechanism and this portion 220 is for controlling the hydraulic power-assistance to a rack-and-pinion type of steering mechanism of which the pinion 130 only is shown in FIG. 7. The steering mechanism includes, as is conventional, a piston-and-cylinder arrangement (not shown) by which power-assistance can be given to movement of the rack of the rack-and-pinion steering.

The control-valve portion 220 includes a housing 221 constituted by an end plate 222 of the steering box and a transverse wall 223 extending across that steering box.

The end plate 222 has extending towards the transverse wall 223 a tubular portion 225 loosely surrounding which for radial movement relative thereto but located by a pin 228 against circumferential movement with respect thereto, is an annulus 229. The annulus 229 lies in a chamber 230 formed between the end plate 222 and the transverse wall 223.

As can be seen, the outer periphery of the tubular extension 225 is of such a configuration that it provides between that periphery and the annulus 229 two chambers 240 and 241 the boundaries of which form valve seats 242 and 243 respectively. These valve seats 242 and 243 are engageable by adjacent portions 244 and 245 respectively of the annulus 229. On each side of the chamber 240 are further chambers 246 and 247 respectively and, similarly, on each side of the chamber 240 are further chambers 248 and 249 respectively. Providing communication between the chamber 230 exterior of the annulus 229 and the chambers 246, 247 248 and 249 are bores 250, 251, 252 and 253 respectively in the annulus 229. Opening into the chambers 240 and 241 respectively, are conduits 257 and 258 each of which communicates with one of the ports 131 and 132. The port 131 communicates (through a connection not shown) with one side of the piston of the piston-and-cylinder powerassistance arrangement and the port 132 communicates (also through a connection not shown) with the other side of the piston of that arrangement. Extending through to the inner periphery of the tubular extension 225 from the chambers 240 and 241 respectively are conduits 254 and 255 respectively.

The inner periphery of the tubular extension 225 constitutes an axially-extending bore 256 into which projects from through the transverse wall 223 a spigot 290 constituting an axle to which the pinion 130 is rigidly secured. The spigot 290 is a loose fit in the bore 256 so that it is laterally displaceable therein. The inner periphery of the tubular extension 225 of the end plate 222 is such that it provides between that iner periphery and the bore 56 two cavities 295 and 296 which communicate with the conduits 254 and 255 respectively. At right-angles to the cavities 295 and 296, the spigot 290 forms with the bore 256 a pair of passages 299 and 2100 the boundaries of which form valve seats or restrictions 132 and 133 engageable with which are portions 134 and 135 respectively of the spigot 290. Between the cavities 295 and 296 and the passages 299 and 2100 are further cavities 136, 137, 138, and 139 formed within the inner peripheral wall of the tubular extension 255.

The passages 299 and 2100 communicate through the bore 256 with an exhaust port 2110.

Communicating with the chamber 230 is an inlet port 2111.

The vehicle steering mechanism above described with reference to FIGS. 7 and 8 operates as follows:

With no transverse thrust on the spigot 290 and the hydraulic inlet port 2111 connected to a conventional flow-controlled hydraulic pump (not shown), hydraulic fluid is fed by the pump through the inlet port 2111 to the chamber 230. The fluid flows from the chamber 230 through the annulus 229 via the bores 250, 251, 252 and 253 into the chambers 246, 247, 248 and 249. The annulus 229 not being seated on either of the valve seats 242 and 243 the fluid flows past these valve seats into the chambers 240 and 241. In one fluid path, the hydraulic fluid in the chamber 241 communicates via the conduit 258 and the port 132 with one side of the piston of the piston-and-cylinder power-assistance arrangement. By another fluid path, the fluid in the chamber 241 flows via the conduit 255 to the chamber 296 between the spigot 290 and the bore 256 in the tubular extension 225. Similarly, fluid presented at the chamber 240 communicates via the conduit 257 with the port 131 and from thence with the opposite side of the piston of the piston-and-cylinder power-assistance arrangement. Fluid flow occurs only via the conduit 254 to the cavity 295 between the spigot 290 and the bore 256. The spigot 290 (due to the pinion 130 at this stage not being under any load) is located centrally within the bore 256 and, this being so, the fluid presented at the cavities 295 and 206 flows to the port 2110 via the cavities 136, 137, 138 and 139, chambers 299 and 2100, bore 256, and exhaust port 2110 to be returned to the inlet of the pump.

The annulus 229 being free for radial movement relative to the tubular extension 225, tends to centralise itself thereabout to equalise the resultant forces on it arising from the pressure-drop due to flow of fluid through the bores 250, 251, 252 and 253 in the annulus.

It is thus observed that as in the previously discussed arrangement, the apparatus provides two parallel paths for fluid flow between the input port 2111 and the output port 2110 and the annulus positons itself for equilibrium whilst always maintaining an equal pressure drop across the two parallel paths.

A vehicle wheel reaction may be exerted via the pinion 130 to the spigot 290 to cause an off-centre displacement of the spigot 290 to a position approximately as shown in FIG. 8. In these circumstances due to the fact that the spigot is now closer to the valve seat 298 and further from the valve seat 297, there is an increase of pressure in the chamber 240 and a reduction of pressure in the chamber 241. The annulus 229 therefore repositions itself for equilibrium approximately as shown. The distribution of the identical pressure drops across the parallel paths in the system is therefore now different in each, the pressure in chamber 240 having moved towards the input port pressure value whereas that in port 241 has moved towards the output port pressure. There is therefore a resultant force exerted by these two fluid pressures via the ports 131 and 132 on the power assistance pistons tending to urge the steered wheels towards a position in which spigot 290 can be returned to its central position.

Referring now further to the spigot 290, the resultant fluid pressures in cavities 295 and 296 exert a reaction force on the spigot 290 to thereby introduce an element of "feel" into the system. Again, the characteristic of pressure rise with applied steering pinion torque may be a linear relationship to the simplest case but by providing the secondary cavities 136, 137, 138 and 139 and suitably chosen more or less constant flow restrictions between them and the outlet passages a nonlinear characteristic by which pressure rises rapidly with torque applied to the pinion 130 can be produced. The reaction produced in the areas of these cavities is again flow dependent and when a point is reached at which the total pump flow is via the high pressure side, any further torque applied to the pinion 130, has the effect of increasing very rapidly the output pressure in chamber 254 owing to the small area of the valve seat 298 which presents further restriction on increased torque. A typical characteristic of steering shaft torque against differential power asistance output pressure is shown at A in FIG. 9(b). Here it is seen that a more or less linear rise of pressure occurs with torque up to a point X. This rise is due to the reaction produced by increasing flow rate in chamber 136 and 137. When a maximum flow in 136 and 137 is reached, further increased torque is reacted against by the area of cavity provided by passage 297 so that the slope of the characteristic changes markedly at X to give a useful vehicle parking characteristic.

In a modification of the arrangement of FIGS. 7 and 8, a spring side loading may be applied to the pinion 130 in a suitable manner to urge the spigot 290 against one or the other of the outlet passages 299 or 2100. Assuming the thus closed passage is 299, when a small steering torque is applied to the pinion 130 the chamber 254 is constructed but all the flow in the fluid flow path including it now passes via the cavity 137 as the outlet via the other cavity 136 is blocked by the effect of the side loading. Assuming that the area of cavity 136 is substantial in relation to that presented by 254 to the spigot this gives rise to a preliminary portion of the characteristic up to the point y as shown on characteristic B of FIG. 9(b). The full initial pressure increase now tends to be applied over the area of chamber 254 and of the cavity 136. In other words the pressure rise which without the side loading was applied only to 254 is now applied also to cavity 136. This larger reaction is maintained up to the point where the pressure in the high pressure chamber 136 is sufficient to overcome the sideloading and the flow passes to both outlet passages. Increased pinion loading now causes the arrangement to function substantially as previously. In this case by providing the said side loading, a three part torque against output pressure characteristic is obtainable. The side loading may be provided in a rack and pinion type of steering box arranged by providing a spring loading on the rack support in the rack and pinion gear.

In each of the arrangements described above, there is provided a floating annulus which operates in conjunction with valve seats to balance the pressures between the two parallel paths. In modified arrangement, alternative means which adopts an equilibrium position to satisfy the equality of pressures across the parallel paths may be adopted. One such modified arrangement is included in the arrangement of FIGS. 10(a) and 10(b) the arrangement of which is so simplified as to be adaptable to a steering box of many accepted forms. In the form shown however it does not provide the change of slope of its characteristic such as referred to previously at point X of FIG. 9(b).

Figure 11B:
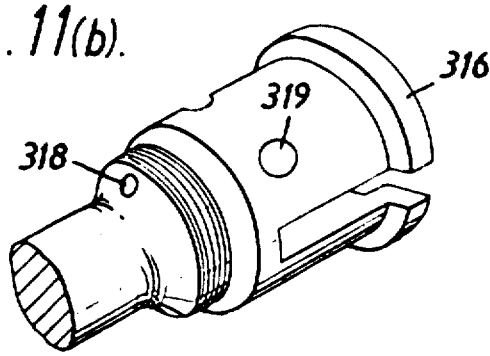

Referring to FIG. 10 there are shown at (a) and (b) two sectional views, (b) being the view on section A—A of (a). Additionally FIG. 11 (a) and (b) shows perspective views of the input and output shafts respectively of the arrangement of FIG. 10(a) and (b).

In FIG. 10(a) and (b) the steering box has a housing 301 between which and an end cap 302 there is housed the output shaft needle roller journal and thrust bearing 303. The input shaft is denoted by reference 304 and runs in a suitable seal to withstand the internal pressure in the housing. As seen in FIG. 10(b) the input shaft is provided with an inwardly extending spade 305 having a pair of valve seats 306 standing within pockets on one face of the spade. The spade also has a small journal 308 which locates within a bore in the output shaft. The output shaft also carries within a bell-end 309 a ball-bearing 310 in which the input shaft is rotatable.

In order to house a double seal in the form of sealing rings 312 and 313 and to clamp the bearing 303, a collar 314 is clamped in position on the output shaft by means of a nut so that 303 and 314 are clamped between the nut 315 and a flange 316 on the outward end of the bell-end 309. A passage 318 passes inside the nut 315 to break out into cylinder 329. A passage 319 is also provided in the output shaft which communicates via an aperture 320 in the collar 314 with an annular region 321 between seals 312 and 313. Passage 319 is thereby in permanent connection with a bore 322 in an end plug 323 in a bore 324 in the housing 301. Also in the bore 324 there is a slideable bobbin 325 carrying valve seats 326 and 327 which when the bobbin is in one or other of its extreme positions can close off passage 322 or a passage 328 between the bore 324 and the region 329 of the steering box. The hydraulic fluid input port is denoted by reference 330 and this is in connection with the inside of the bobbin 325 and via apertures 331 and 332, with the passages 322 and 328. A power assistance pressure port is denoted by reference 333 and is connected to passage 322. Via an external connection not shown, the port 333 is connected to a chamber such as 329 on the other side of the power assistance piston therefrom. The fluid outlet port is denoted by reference 334 and this leads to the fluid sump. The bell-end 309 of the output shaft is provided with a centrally disposed transverse slot machined so that the thicker central part of the spade 305 is a close fit, as best seen from FIG. 10(b), but never-the-less permitting a certain amount of relative rotary motion between the shafts. The valve seats 306 and 307 are such as to face the passages 318 and 319 respectively and on the reverse side of the spade 305 and bearing thereupon are housed springs 335 and 336 the function of which is to position 305 symmetrically within the slot in the absence of other forces and thereby provide a similar centering effect to that achieved by the torsion bars provided in the previously described embodiments.

Considering now the manner of operation of the power assistance control device of FIG. 10(a) and (b), the hydraulic pump supplies fluid under pressure at a substantially constant flow rate to the port 330. with the spade 305 in the position shown the bobbin 325 takes up its shown position, the flow through apertures 331 and 332 being substantially equal. The first of the parallel fluid flow paths is via 331, 322, 320, 319, the cavity formed within valve seat 307 and via the inside of the bell-end to outlet port 334. Similarly, the second parallel flow path is via passage 332, 328, chamber 329, passage 318, the cavity enclosed by valve seat 306, the inside of the bell-end to the outlet port 334.

Assuming that a reaction force is exerted on the output shaft from the steering linkages to the wheels, this may typically tend to bring valve seat 306 towards and valve seat 307 away from the respective passages 318 and 319. An increase of pressure therefore occurs in the cavity enclosed by 306 which is transmitted to the right-hand side of bobbin 325 to urge the latter leftwards to tend to cause seat 327 to close off passage 322. If 322 is so closed off, the total flow of fluid is via aperture 332, passage 328 etcetera into the now restricted cavity enclosed by seat 306 of the spade 305. This means that a maximum pump pressure is applied over the area enclosed by seat 306 and gives rise to a reaction transmitted back to the steering wheel to give the arrangement feel. Additionally, this pressure is applied via the port 333 to pressurise the power assistance chamber connected thereto to assist the force exerted on the input shaft in turning or maintaining the vehicle wheels in the required position.

From the foregoing, it will be observed that the arrangement can provide two stages of operation. The first is when the reaction is predominantly mechanical through the springs 335 and 336. The second stage is when due to difference of pressures across the bobbin 325, the low pressure path is at least partially closed off by the bobbin and normal torque reactions are progressively produced by the pressures in (say) the cavity enclosed by valve seat 306.

In the above described embodiments of the invention two forms of the flow divider employed as an integral part of the control device have been shown, namely the flow divider ring of the first two embodiments and the flow divider bobbin arrangement of the third embodiment. An extremely simple and inexpensive alternative form of flow divider which may be included to replace the flow divider ring or the bobbin as the case may be is shown in diagrammatical form in FIG. 12.

Referring to FIG. 12, the flow divider comprises a steel ball 401 which is free to move within a bore 402 in order to cover or partially cover end ports 403 or 404 which lead to the parallel fluid flow paths and are connected as will be recalled, to the power assistance output port. The flow divider has an input port 405 restricted passages 406 and 407 from which communicate with the ends of the bore on either side of the ball 401.

In operation of the flow divider of FIG. 12, fluid is fed via the two restricted passages 406 and 407 to each end of the bore 402 and thence via the end ports 403 and 404 to the valve means of the control device. An increase of flow to one side of the ball 401 results in an increased pressure drop across inlet passage, say 407, to produce a pressure difference across the ball which tends to move the ball in order to restrict the outlet port 404 on the side subjected to the initial flow increase. The area of the ball then exposed to the low pressure in the output port 404, then influences the force balance on the ball so that a lower pressure is required on the unrestricted side of the ball, which is exposed to equal pressure over its entire surface. This condition pertains when the flow to the unnrestricted port 403 is greater than that to the other port.

The form of flow divider shown in FIG. 12 can have two advantages over the spool arrangement of FIG. 10 for example. Friction between the relatively moving parts is negligible and slight fluid flow around the ball itself merely results in a stabilising effect upon the operation of the control device as a whole and benefits the operation by smoothing the characteristic curve to give a softer transition between the two or more phases (as the case may be) of operation.

A further embodiment of a steering box using the invention is shown in FIGS. 13(a) and 13(b) in which the box has a housing casting, the end bearing housing 402 of which encloses the main parts of the control device the mechanical input to which is via the shaft 403 which constitutes the control member. The shaft 403 runs in bearings 404 and 405. The latter is housed in a ring 406 which is sealingly rotatable within the housing 402 and having seals 407 and 408 to form an annular passage 409 which as will be seen later constitutes part of a fluid flow path. The bearing 404 operates between the end spigot 410 of the shaft and an end flange 411 of the ball screw shaft 412 which again runs in a ball bearing 413 between itself and the housing 401. The ring 406 referred to above is bolted to the flange 411 and a seal is provided therebetween.

The section of FIG. 13(b) is taken through a flange which is formed on the control member or shaft 403 to the right of the end spigot 410. In FIG. 13(b) it can clearly be observed that this flange is provided with a diametrically opposed pair of grooves 415 and 416 in which are positioned cylindrical slugs 417 and 418 respectively. The grooves 415 and 416 are somewhat less than semicylindrical and the rods or slugs 417 and 418 also lie within internal further grooves 419 and 420 in the ring 406. These grooves each comprise a part of said aperture and have partially-cylindrical flanks against which the slugs fit but these flanks are spaced apart to allow movement of the cylinders from one flank to the other with movement of the control member.

As shown in FIG. 13(b) respective passages 421, 422 are provided in the annulus 406 between the annular passage 409 and one flank of the respective grooves 419 and 420. Further passages 423 and 424 are provided via drillings in the ring 406 and the flange 411 between the right hand power cylinder volume 424 and the other flanks of the grooves 419 and 420. As will be seen, the cylinders 417, 418 and the grooves 419 and 420 constitute the valve means of the device.

Centering for the valve means and control member is achieved by a pair of springs 425 and 426 which are shown in enlarged scale in FIG. 15. These are fitted into a transverse drilling 427 in the control member in such a manner that a preload is exerted on the dimpled portions 428 of the springs and reacted against the central portions 429. The flat ends of these springs engage into shallow slots 431 in the internal surface of the ring 406 so that the ring 406 is held in a central position relative to the control member and can be rotated only by overcoming the preload in the spring members and further deflecting these spring members.

The other main component of the device is the fluid flow divider. This shown particularly in FIG. 14 and comprises an arrangement largely as described with reference to FIG. 12 and comprises a steel ball 430 which is free to move within a bore 431 to cover or partially cover end ports 432 or 433 of which 433 leads to a passage 434 which communicates on the one hand with the above mentioned annular passage 409 and on the other hand via a passage 435 to the left hand power assistance chamber which is not shown. The other part 432 communicates via a passage not shown but which has an outlet 436 FIG. 1 into the right hand power assistance cylinder. It will be recalled that in turn this connects to passages 423 and 424. The input to the flow divider from the hydraulic pump is via input port 437 which via passages 438 and 439 communicates with either side of the ball 430.

In operation of the device, it may be assumed first that the control member 403 and the valve members comprised by slugs 418 and 419 are in the position shown relative to the ring 406. That is there is a substantially equal spacing between the slugs 418 and 419 and the flanks of the respective grooves 419 and 420. In this position, fluid flow occurs via input port 437, passage 439, port 433, passage 434, annulus 409, passages 421 and 422 and the space between slug 417 and 418 and the respective flanks of grooves 419 and 420 to sump. These latter paths are the first of two parallel flows through the device. The second of these flows is from input port 437, passage 438, port 432, the housing and outlet 436 the cylinder volume 424, the passages 423 and 424 and the space between slugs 417, 418 and the respective flanks of grooves 419 and 420. The flows through the two parallel paths including the flow divider and the valve means are substantially equal and no hydraulic reaction occurs between the slugs 417, 418 and the flanks of the grooves 419 and 420.

Assuming now that a road wheel force is exerted via the flange 411 and reacted by the driver holding the steering wheel and therefore control member 403 against movement. If the force exerted is sufficient to overcome the preload on springs 425 and 426 in one direction there is movement of ring 406 relative to slugs 417 and 418. If this movement is clockwise in FIG. 2, there is a resultant reduction of the spaces between slugs 417 and 418 and the flanks of grooves 419 and 420 which connect with passages 423 and 424. There is therefore a resultant redistribution of pressure in the one parallel flow path which includes these such that a pressure increase occurs in passages 423 and 424 and therefore the cavities formed thereby upstream of the slugs 417 and 418. This pressure is reacted through the control member as a hydraulic component of feel and is also applied to the piston in the power assistance cylinder 424. Due moreover to the increase of pressure downstream of the flow divider port 432, the ball 430 is moved to the right to reduce the flow via port 433, so that in the limit the total flow occurs in the high pressure side of the system. From the valve of steering shaft torque at which the springs 425 and 426 deflect, the power assistance afforded by the control device is dependent upon the forces generated due to fluid pressure between the slugs 417 and 418 and the respective flanks of the grooves 419 and 420 due to the fluid flow from the hydraulic pump. A deflection in the opposite direction, tending to cause the cylindrical surface of slugs 417 and 418 to close the openings to sump via passages 421 and 422 produces a reaction and power assistance in the opposite sense due to the pressure increase which occurs in the passage 435 and which is communicated to the other power assistance cylinder (not shown).

The sump of the system is not shown but the totality of the fluid volume to the right of the seal 408 is the outlet region, the outlet pipe having an arrow (FIG. 13b.) comprising the drain to sump.

Although not mentioned previously since they have no bearing upon the normal operation, the drawings show two check valves 441 and 442. Valve 441 is included in a passage in the annulus 406 and the valve 442 is included in a passage in the flange 411. These valves permit hydraulic fluid to flow from the external reservoir or tank which is often included in the hydraulic pump to fill the power assistance cylinder in the event of the pump stopping or under purely manual operation. Existing power assistance arrangements normally include such a check valve between the delivery and return lines but the arrangement described here using a divided flow, requires two such check valves in the absence of some alternative.

In order to avoid the need for two check valves such as just mentioned, the flow divider may be modified as shown in FIG. 14 to include between the ball 430 and the end ports 432 and 433 two light centering springs 443 and 444. These springs are such as to prevent complete closure of either end port with the pump inoperative so as to provide a by-pass passage through the flow divider to permit fluid to pass from one assistance cylinder to the other.

An additional effect of the springs 443, 444 is to increase the pressure at which full flow is established on the high pressure side of the valve means.

In order to establish this to compensate for the springs, the areas of the end ports 432 and 433 are slightly adjusted by increasing them for the same diameter of the ball 430. Such increased areas create reduced fluid flow resistance and therefore can render the device more efficient than without the springs 443 and 444.

It will be observed that in the presently described arrangement the reactions and power assistance forces are generated in the main by the cavities formed upstream of the valve members 417 and 418 in the parallel flow paths and in order to achieve complete closure of the valve passages on the high pressure side under high torque, the slugs 417, 418 tend to be squeezed radially out from the grooves 415 and 416 by contact with the lips of the grooves 419 and 420 reacting against the flanks of the grooves 415 and 416 respectively. This effect is accentuable by forming the grooves 415 and 416 to be a slightly greater radius than the slugs.

Finally, it will have been observed that whilst the pump is operating and the flow divider is not in an extreme condition, there is a steady flow of fluid through the gear box, since one of the parallel paths includes the region 424. This is beneficial from the point of view of equalisation of temperatures especially in cold conditions.

Referring now to FIG. 16 this illustrates in sectional diagrammatical form an improved form of flow divider suitable for use in either of the power assistance control devices described above. The flow divider in the present instance comprises a first chamber 501 and a second chamber 502 formed by the spaces at either end of a freely slideably fitting cylindrical member 503 in a cylinder the length of which appreciably exceeds the length of the member 503. The chambers 501 and 502 have a common input passage 504 via which hydraulic fluid is applied from a constant flow source not shown to input ports 505, 506 and 507, 508 of the chambers 501 and 502 respectively. The ports 505 and 506 are so disposed in the wall of the cylinder as to be progressively partly covered by movement of the member 503 from a central position towards the left and the ports 507 and 508 are so positioned as to be progressively partly covered by movement of 503 from a central position towards the right.

The member 503 is further provided with conical flow divider valve members 509 and 510, which complementarily open and close outlet restrictions 511 and 512 between chambers 501 and 502 and output passages 513 and 514 respectively. It is to be observed moreover that whilst a smal amount of movement of 503 about its central position is provided for over which no change of the input restrictions occur, in either extreme position when an output restriction is closed off by the respective conical valve, the respective input restrictions remain at least partially open. Indeed, the output restrictions are always more restrictive. That is the output restrictions are always of effectively smaller area than the input restrictions.

For the reason discussed above with reference to FIGS. 13 and 14, it is also desirable to include light springs as shown by references 515 and 516 on each side of the member 3.

In operation of the flow divider, it may be assumed that it is employed upstream from flow control restrictions connected in the output passages 513 and 514 and which are comprised by valve means of one of the forms described above. The restrictions in 513 and 514 are therefore variable complementarily, an increase of one being accompanied by a reduction of the other. Assuming the passage 514 is restricted by the valve means there is a resultant increase of pressure in the passage 514 and chamber 502 moves to the left and the flow from 504 increases via 507 and 508 and reduces via 505 and 506. A new equilibrium position is therefore established in which the forces due to the pressure in chambers 501 and 502 acting on 503 balance.

Due to the fact that the pressure drop across a constriction is proportional to the square of the flow rate through it, there is a tendency in the absence of variable input restrictions such as shown in the arrangement above, for the member 503 to become unstable at a certain point. The effect of the input restriction is to impose a greater change of flow for a given change of pressure difference between the passages 513 and 514 than would otherwise occur. That is there is an increase in concentration of flow towards the high pressure side of the flow divider for lower pressure differences between 513 and 514. This is demonstrated by the curves Q1 and Q2 in the graphical illustration of FIG. 17, which curves indicate typical flow change curves for the full range of pressure differences between 513 and 514. Curve Q2 represents a flow curve for a device using variable side port restrictions such as 505 nd 506 whereas Q1 represents the linear curve which is obtained in the absence of such variable port restrictions. The effect which is combined with that of these curves is the effect due to the above mentioned square-law relationship between pressure and control valve area. This is shown typically by curve A1 which represents variation of pressure difference over the range of control valve area, if flow is kept constant at Q2. When flow increases in the manner of the curve Q1 the required control valve area will diverge from the A1 curve thus decreasing the slope of the A1 curve and, in some instances, creating a reversal of the slope towards the point at which full flow Q is attained. Such a reversal could make the valve unstable. By superimposing a flow change in the manner of curve Q2 the divergence of the modified area curve woulb be more rapid over the low pressure region of curve A1 (where the initial slope of A1 is greatest) and less rapid in the high pressure region, thus avoiding the slope reversal and consequent instability. The form of flow curve Q2 has the added advantage over Q1 that more flow is available to move the power assistance piston rapidly at low pressure.

In the above description of FIG. 14 it has been explained that where the flow divider is such as to be capable of virtually closing off the flow of fluid, that is it acts as a check valve, it is desirable to provide a form of resilient spring loading so that the steering mechanism may be operated without a fluid pressure supply operating. This can apply equally to the other embodiments of the device according to the invention.

Further, although by way of specific examples, the slightly varied forms of flow divider are proposed for the various embodiments of the invention which have been described in the foregoing, these forms of flow divider are by no means special to the particular embodiments in which they are utilised. Indeed, the most highly developed form of flow divider is that which has been described with reference to FIGS. 16 and 17 and it may be preferable to employ such a flow divider in either of the embodiments of the device according to the invention. In certain of the foregoing embodiments of the invention it will be recalled that there are formed two types of cavity between the first and the further valve members. On the one hand a cavity is formed which is largely pressure responsive and on the other hand a cavity is formed which is largely flow responsive having regard to the reaction generated therein and fed back to the control part. In general by choice of the dimensions of and the particular arrangements of the valve members, it is to be appreciated that one type of cavity can be provided without the other or alternatively, a cavity which by virtue of an initially reducing restriction downstream thereof is initially a pressure responsive cavity can degenerate to a flow responsive cavity when a fixed size of the restriction is reached. Again, after attainment of that fixed value of restriction a further restriction downstream thereof may continue to reduce to provide an additional pressure responsive cavity downstream of the former cavity. By such means, particular desired operation characteristics may be produced.

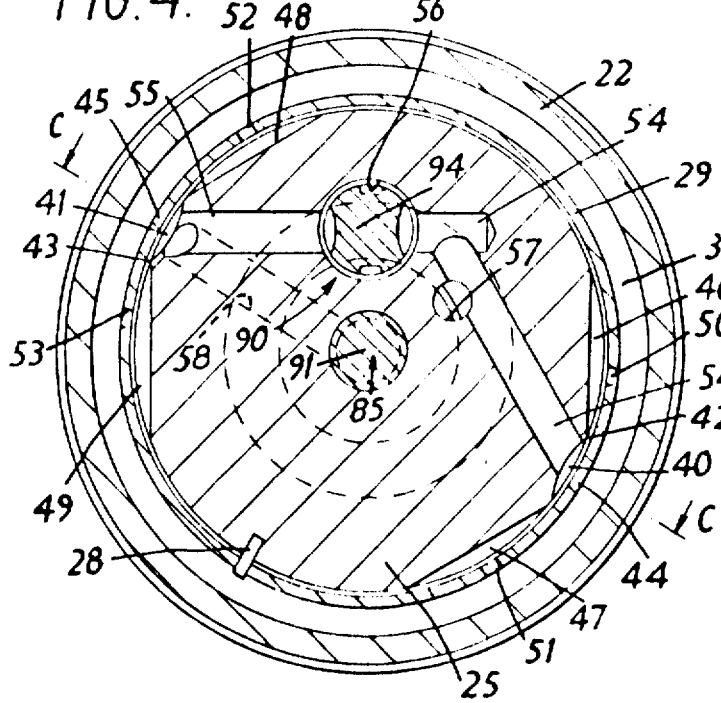
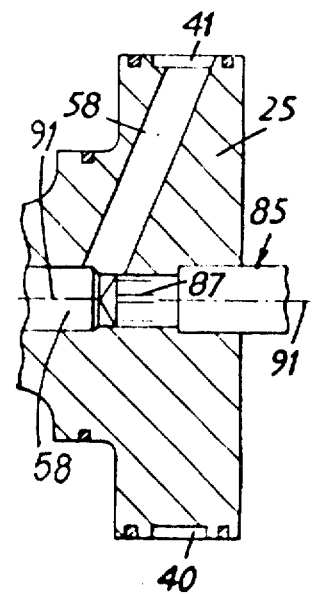
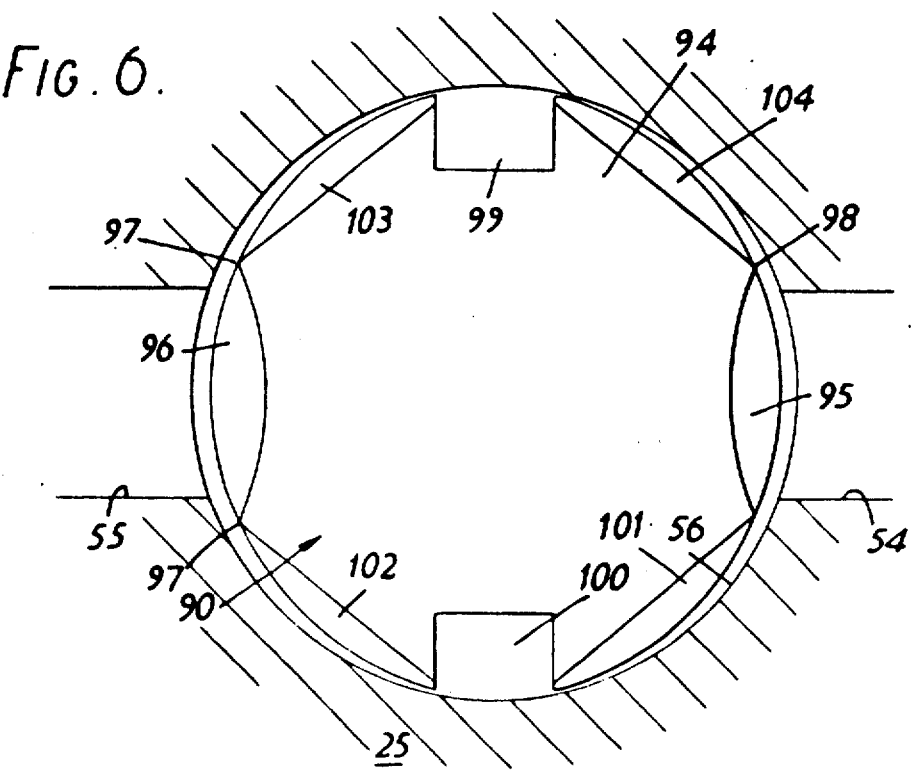

Having thus described our invention what we claim is:

1. A hydraulic power assistance control device for providing power assistance for an effort exerted by a control part, the device having a fluid input port and a fluid outlet port, a fluid flow divider for dividing fluid flow from the input port between two parallel fluid flow paths, the flow divider being such as to provide flow restriction in said paths and including means whereby an increase of fluid pressure downstream thereof in one path relative to that in the other path gives rise to an increased restriction in the latter path the device also including valve means having a first valve member displaceable by the control part relative to a further valve member in either of two directions from an intermediate position, and a respective pressure output port connected to each said path between the flow divider and the valve means, the valve members being so shaped as to on the one hand provide between them variable restrictions in each said path such that of said movement is effective to increase one restriction and on the other hand to provide between them respective reaction cavities in the flow paths, the fluid pressures acting within the cavities to produce reactions between the members which are transmissible to and counteracted by the control part.

2. A hydraulic power assistance control device as claimed in claim 1, wherein said flow divider comprises a flow divider valve member movable under the influence of resultant fluid pressure across it to increase a restriction in one said path and decrease a restriction in the other said path towards a stable position.

3. A hydraulic power assistance control device as claimed in claim 2, wherein the flow divider comprises an annulus freely movable within an annular chamber the flow paths passing between regions inside and outside the annulus and movement of the annulus being such as to bring the annulus towards one passage through a wall of the chamber and away from another passage in said wall, said passage being in the respective flow paths.

4. A hydraulic power assistance control device as claimed in claim 2, wherein the flow divider comprises a cylindrical chamber having passages at either end thereof and respectively forming parts of said paths and said movable flow divider valve member being displaceable in said cylindrical chamber between said passages.

5. A hydraulic power assistance control device as claimed in claim 4, the flow divider valve member comprising a spherical valve member the supply to which from the input port is via respective passages to either end of the cylindrical chamber.

6. A hydraulic power assistance control device as claimed in claim 4, the flow divider valve member comprising a cylindrical member having conical end portions which co-operate with the passages at either end of the cylindrical chamber.

7. A hydraulic power assistance control device as claimed in claim 6, when the supply to the flow divider is via respective passages to either end of the cylindrical chamber and the cylindrical valve member cooperates with the latter passages to introduce restriction on the input side thereof in addition to that provided by the conical end portions.

8. A hydraulic power assistance control device as claimed in claim 4, the flow divider valve member comprising a spool shaped member slideable with the cylinder between the ends thereof and the input thereto being substantially central and via respective apertures in the spool ends.

9. A hydraulic power assistance control device is as claimed in claim 2, the flow divider being provided with resilient means for in the absence of hydraulic fluid pressure, urging the flow divider valve member towards a predetermined intermediate position and to thereby inhibit check valve action.

10. A hydraulic power assistance control device as claimed in claim 9 for a rack and pinion system wherein the first valve member comprises a cylindrical spigot on a shaft adapted to be on the same axis as the pinion of the system and the further valve member comprising a body with a cylindrical aperture, said aperture having valve seats formed internally thereof such as to co-operate with the spigot which is loosely engageable therewith and is urged towards one valve seat or another by a reaction from a rack engageable with the pinion.

11. A hydraulic power assistance control device as claimed in claim 10, the internal surface of the aperture being formed with edges such as to define symmetrically opposed valve seats which in respective extreme position of the spigot relative to the aperture define the said respective cavities.

12. A hydraulic power assistance control device as claimed in claim 11, the internal surface of the aperture being formed with edges downstream of the said cavities which define further cavities the pressure and therefore the reaction exerted in which is substantially fluid flow dependent.

13. A hydraulic power assistance control device as claimed in claim 12, the spigot being resiliently urged transversely to said cavities to cause it to execute a rolling motion across the valve seats.

14. A hydraulic power assistance control device as claimed in claim 1 wherein the first valve member comprises a spigot movable eccentrically by and relative to the axis of rotation of an input shaft and being loosely engageable within an aperture correspondingly eccentrically displaced in a part of an output shaft which forms the further valve member.

15. A hydraulic power assistance control device as claimed in claim 14, the spigot being shaped with edges forming symmetrically opposed valve seats which in respective extreme positions relative to the aperture define the said respective cavities.

16. A hydraulic power assistance control device as claimed in claim 15, the spigot being formed with further respective edges downstream of the said respective cavities forming further cavities the pressure and therefore the reaction exerted in which is substantially fluid flow dependent.

17. A hydraulic power assistance control device as claimed in claim 1, said first valve membr comprising a spade shaped member on one shaft and said further valve member comprising a member having a slot in a housing on another shaft to loosely accommodate the spade shaped member and a valve action occurring in operation by virtue of rotation of one shaft relative to the other such as to cause rocking of the spade shaped member within the slot, valve seats being formed on the opposing faces the areas enclosed by which are such as to effect said reactions.

18. A hydraulic power assistance control device as claimed in claim 1 wherein said first member of the valve means is cylindrical and the cylindrical surface thereof has a radius to match internal radii of internal surfaces of a partially cylindrical part of an aperture in the further member and within which aperture the control member carrier the one member between said internal radii.

19. A hydraulic power assistance control device as claimed in claim 18 wherein said aperture and the control part are largely cylindrical respectively internally and externally the control member having a groove within which and the internal surface of said partially-cylindrical part of the aperture the one member is retained.

20. A hydraulic power assistance control device as claimed in claim 1 including resilient means for urging one valve member towards a predetermined position in relation to the other valve member.

21. A hydraulic power assistance control device as claimed in claim 20 wherein said resilient means comprises a pair of prestressed leafsprings retained in a drilling to locate them relative to the control part and the ends of which springs engage the further member.

* * * * *

UNITED STATES PATENT AND TRADEMARK OFFICE
CERTIFICATE OF CORRECTION

PATENT NO. : 3,875,966　　　　　　　　　　Page 1 of 10

DATED : April 8, 1975

INVENTOR(S) : Alistair Gordon Taig

It is certified that error appears in the above-identified patent and that said Letters Patent are hereby corrected as shown below:

INSERT THE SHEETS OF DRAWINGS AS PART OF LETTERS PATENT 3,875,966, AS SHOWN ON THE ATTACHED SHEETS.

Signed and Sealed this

Fifteenth Day of May 1979

[SEAL]

Attest:

RUTH C. MASON
Attesting Officer

DONALD W. BANNER
Commissioner of Patents and Trademarks